Dec. 2, 1952  J. M. LURIE  2,619,753
METHOD OF MAKING DECORATIVE SHEETS
Filed April 14, 1947
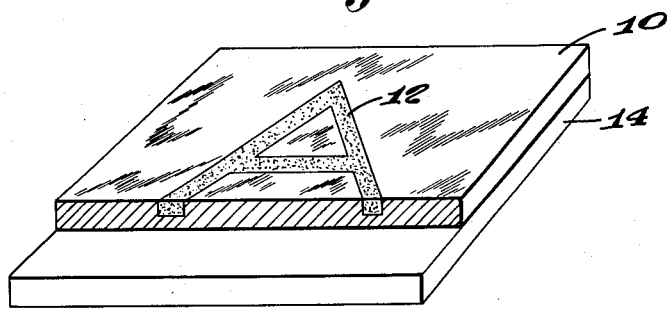
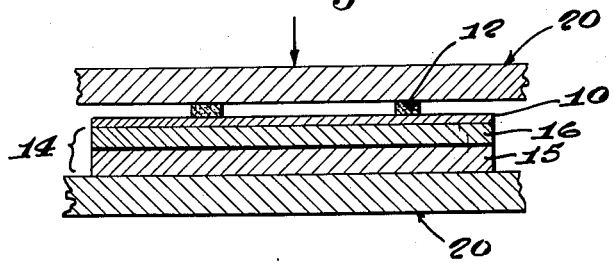
Inventor:
Joseph M. Lurie Patented Dec. 2, 1952

2,619,753

UNITED STATES PATENT OFFICE 2,619,753

METHOD OF MAKING DECORATIVE SHEETS

Joseph M. Lurie, Lewiston, Maine, assignor to Bonafide Mills, Inc., Lisbon, Maine, a corporation of Maine Application April 14, 1947, Serial No. 741,236

1 Claim. (Cl. 41—35)

This invention relates to a decorative plastic sheet and to a method of making the same.

The invention has for one object to produce a novel plastic sheet having a design embodied in one surface thereof, which may be economically manufactured and used with advantage as a decorative floor and/or wall covering and for other purposes.

A further object of the invention is to provide a novel decorative laminated sheet having a plastic surface and a design embodied in the plastic surface.

A further object of the invention is to provide a novel, economical and highly efficient method of producing a decorative plastic sheet of the character specified.

With these objects in view, and such others as may hereinafter appear, the invention consists in the decorative plastic sheet and in the method of making the same hereinafter described and particularly defined in the claim at the end of this specification.

In the drawings illustrating the preferred embodiment of the invention, Fig. 1 is a perspective of a decorative laminated plastic sheet; Fig. 2 illustrates the design component of the laminated sheet preparatory to assembly with the remaining components of the laminated sheet; and Fig. 3 illustrates in section the assembly of the design and remaining components in a press used in producing a decorative laminated sheet embodying the invention.

In general, the present invention contemplates the production of a decorative plastic sheet, and particularly a decorative laminated plastic sheet. In producing a decorative laminated sheet I first produce the desired design upon a thin preformed sheet of an elastomer, such as a sheet of synthetic resin of a thermo-plastic nature. For example, one such resinous sheet may comprise a sheet embodying a copolymer of vinyl chloride and vinyl acetate. The design may be printed, stenciled, or otherwise formed upon one surface of the sheet so as to upstand therefrom for a substantial distance, and the thus printed sheet will be hereinafter referred to as the design component. The body portion of the ultimate laminated sheet to be produced may comprise one or more layers characterized by a surface of substantial thickness also of a thermo-plastic material such as a thermo-plastic synthetic resin. The design component and the body portion of the laminated sheet are then assembled with the design component applied to the thermo-plastic surface of the body portion and then the assembly is subjected to heat and pressure sufficient to soften the resinous or thermo-plastic layers and to permit the design itself to become embedded in the softened upper surface of the layer or body portion of the sheet, so that after the pressed and heated assembly has been cooled a laminated sheet having the design visible from the surface thereof and extending a substantial distance into the body of the sheet is produced, thus forming a wearable design capable of wearing down as the sheet is subjected to wear during use.

Referring now to the drawing, which illustrates the preferred embodiment of the invention, 10 represents a thin preformed sheet or film of an elastomer, such as a synthetic resin, a rubber either natural or synthetic, and which may and preferably will comprise a preformed sheet of vinyl resin. The sheet 10 has printed thereon a design 12 in such manner as to upstand a substantial distance from the upper surface of the sheet 10. The design may be applied by printing, stenciling, or in any other suitable manner. The body portion 14 of the laminated sheet may comprise a fibrous sheet 15 having applied to the upper surface thereof a similar layer 16 of an elastomer such as a synthetic resin, a rubber either natural or synthetic, and in the preferred embodiment a preformed sheet of vinyl resin. The body portion 14 of the laminated sheet is now assembled in a press indicated generally at 20 with the design component comprising the printed elastomer sheet 10 superposed upon the elastomer surface 16 of the body portion, and the whole assembly is then subjected to heat and pressure sufficient to render the elastomer sheets 10, 16 soft to thereby permit the design 12 to become embedded in the upper surface of the main body portion of the sheet and both elastomer components to fuse or bond together to form the upper portion of the complete laminated sheet. Upon cooling, and after removal from the press, a laminated sheet having a decorative design visible from the surface of the laminated sheet and with the design extending a substantial distance down into the body of the sheet from the upper surface thereof is produced. Such a sheet finds particular use as a floor covering and the design extending into the body of the sheet forms a wearable design capable of preserving the decorative appearance as the sheet wears down during use.

Viewed in its broader aspects, the invention contemplates the production of a plastic sheet of any nature having the design applied thereto in raised form and embedded into the sheet by pressure.

As above pointed out, the elastomer component may comprise any suitable thermo-plastic material, but satisfactory results have been experienced utilizing synthetic resins, rubbers both natural and synthetic, having the desired thermo-plastic characteristics.

Having thus described the invention, what is claimed is:

The method of producing a decorative sheet, comprising: forming a design of solid thermoplastic material of substantial thickness on one surface of a sheet of similar solid thermoplastic material, simultaneously pressing and heating said sheet and design to soften said thermoplastic materials and embed said design in said surface until the upper face of said design is flush with said surface, said heating being sufficient to cause said sheet and design to fuse together.

JOSEPH M. LURIE.

REFERENCES CITED

The following references are of record in the file of this patent:

UNITED STATES PATENTS

| Number | Name | Date |
|---|---|---|
| 812,531 | Seeser | Feb. 13, 1906 |
| 2,011,648 | Page | Aug. 20, 1935 |
| 2,105,265 | Reilly | Jan. 11, 1938 |
| 2,392,594 | Karfiol | Jan. 8, 1946 |
| 2,404,073 | Karfiol | July 16, 1946 |

FOREIGN PATENTS

| Number | Country | Date |
|---|---|---|
| 471,293 | Great Britain | Sept. 1, 1937 |
| 562,573 | Great Britain | July 6, 1944 |